United States Patent [19]

Ohnishi et al.

[11] Patent Number: 4,875,072
[45] Date of Patent: Oct. 17, 1989

[54] AUTOMATIC DOCUMENT FEEDER

[75] Inventors: Kazuyuki Ohnishi, Nara; Yoshiteru Mori, Osaka; Masakiyo Okuda, both of Osaka, all of Japan

[73] Assignee: Sharp Kabushiki Kaisha, Osaka, Japan

[21] Appl. No.: 201,313

[22] Filed: May 26, 1988

Related U.S. Application Data

[63] Continuation of Ser. No. 2,808, Jan. 13, 1987, abandoned.

[30] Foreign Application Priority Data

Jan. 18, 1986 [JP] Japan ................................ 61-9396

[51] Int. Cl.$^4$ ...................... G03B 27/32; G03B 27/52
[52] U.S. Cl. ..................................... 355/23; 271/246; 271/259
[58] Field of Search .................... 355/24, 23; 271/245, 271/246, 259

[56] References Cited

U.S. PATENT DOCUMENTS

| 4,186,326 | 3/1979 | Taylor et al. | 271/246 |
| 4,203,588 | 5/1980 | Joosten | 271/246 |
| 4,620,782 | 11/1986 | Kurando et al. | 271/259 |

Primary Examiner—Monroe H. Hayes
Attorney, Agent, or Firm—Flehr, Hohbach, Test, Albritton & Herbert

[57] ABSTRACT

An automatic document feeder, made a part of a two-side copying machine which selectably operates in one-side or two-side copying mode of operation, has a pre-feeder which advances a document to be copied next from its original position to a waiting position before reaching a copying position on a document table. A selecting device is further included for controlling the pre-feeder such that the pre-feeder does not function when the second surface of a document is being copied in two-side copying mode of operation.

3 Claims, 3 Drawing Sheets

FIG.—1

AUTOMATIC DOCUMENT FEEDER

This is a continuation of application Ser. No. 002,808 filed Jan. 13, 1987, now abandoned.

BACKGROUND OF THE INVENTION

This invention relates to an automatic document feeder for transporting documents placed on a document tray one sheet at a time onto a document table and, in particular, to such an automatic document feeder to be incorporated in an automatic two-side copying machine which can be operated selectably in either one-side copying mode or two-side copying mode.

An automatic document feeder which is made a part of a copying machine is a device for transporting documents placed on a document tray sequentially one sheet at a time onto a document table. In order to improve the operational efficiency of such a copying machine, it is necessary to reduce the time taken by the document feeder in exchanging document sheets. For this purpose, document feeders have been developed with a waiting position defined between the document table and the position where documents are stacked, a pre-feeding means being also provided such that, after a document is transported to the document table and while this document is being copied, the next document to be copied would be moved forward until its front edge comes to the waiting position. The basic idea of this method has been to reduce the distance to the document table which must be traveled by each document after the preceding document is copied and discharged.

If jamming takes place in a copying machine during its operation, the user must repeat the copying as many times as the number of the copies that were lost. Such operation is usually annoyingly complicated. If the jamming takes place while the second surfaces of the documents are being copied in the two-side copying mode of operation, not only the documents that have already been discharged into the discharge tray and the document which is then on the document table but also the document at the aforementioned waiting position to be fed next must be reset on the document tray. Since the next document to be fed is stopped in contact with the feeding means such as rollers, it must be pulled forcibly against the contact force of such feeding means in order to remove it from the waiting position.

SUMMARY OF THE INVENTION

It is therefore an object of the present invention to provide an automatic document feeder for a two-side copying machine which does not preliminarily send the next document to be fed to a waiting position when the copying machine is operating in two-side copying mode and documents are being fed for the copying of their second surfaces such that the documents can be exchanged relatively easily even if jamming takes place while the second surfaces of documents are being copied.

The above and other objects are achieved by an automatic document feeder of the present invention for an automatic two-side copying machine which can be operated selectably either in one-side copying mode or in two-side copying mode. In such an automatic document feeder, a waiting position is defined and a pre-feeding means is provided as described above but there is also provided a selecting means which allows the pre-feeding means to carry out its function in one-side copying mode of operation or when the first surfaces of documents are being copied in two-side copying mode of operation but prevents it when the second surfaces are being copied in two-sided copying mode of operation.

With the aid of such a selecting means, the document to be fed next when the second surfaces of documents are being copied in two-side copying mode remains where it was originally set and is not advanced to any waiting position. If jamming takes place while the second surfaces are being copied, therefore, the user has only to reset the documents which have been discharged into the discharge tray and the document then on the table and to repeat the copying of only those documents which were lost by the jamming. In summary, the required work in the case of jamming can be completed more quickly and hence the work efficiency of the copying machine can be improved. If jamming takes place while the first surfaces of documents are being copied, the pre-feeding means is utilized to advance the documents to the waiting position because there is then no need to exchange the documents in this case.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIGS. 4A and 4B are front sectional views of the automatic document feeder of FIG. 2, showing its operation.

DETAILED DESCRIPTION OF THE INVENTION

Figure 1:
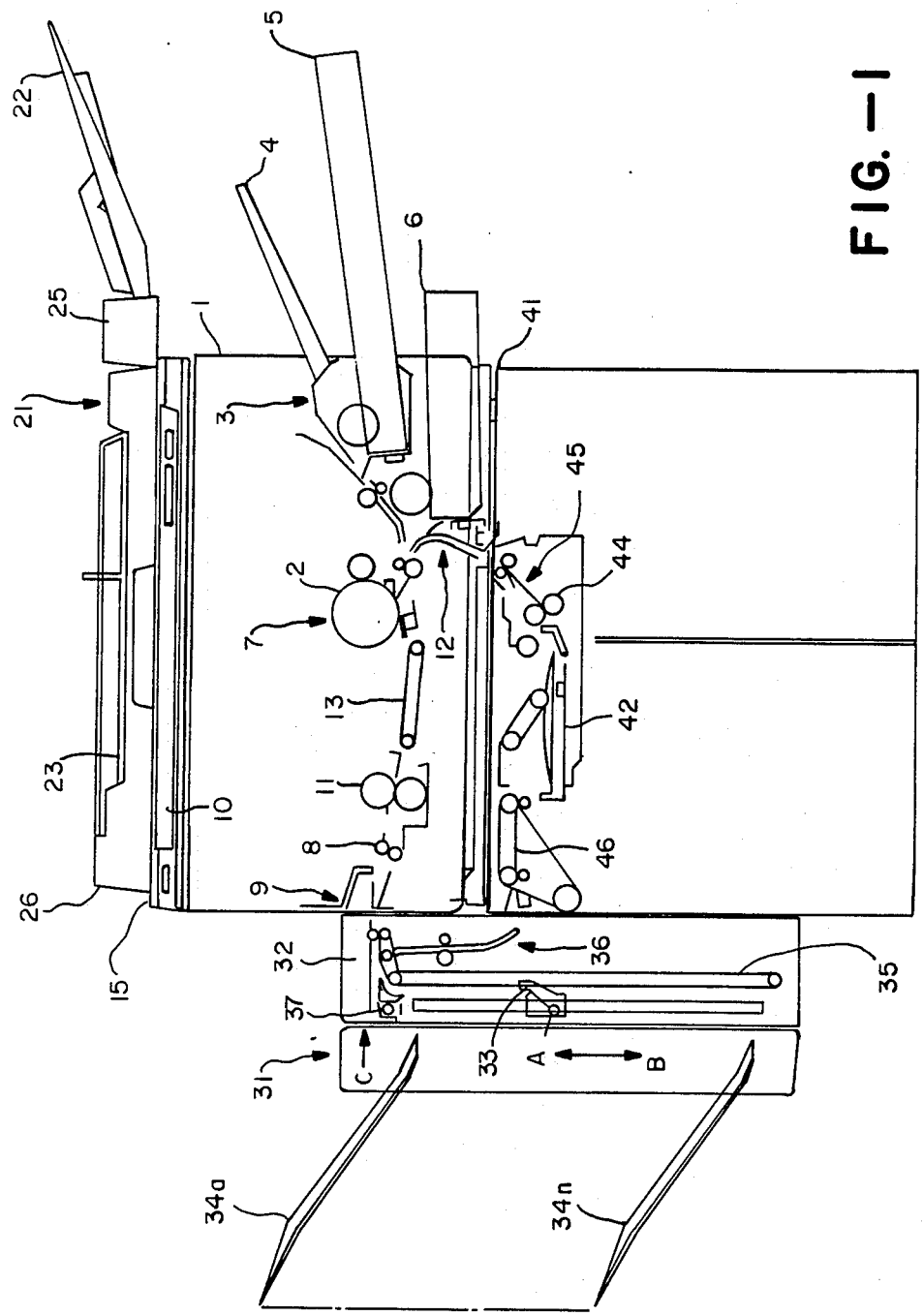
FIG. 1 is a schematic front sectional view of an automatic two-side copying machine of which an automatic document feeder embodying the present invention may be a part.

With reference to FIG. 1 which schematically shows the structure of a copying machine incorporating an automatic document feeder embodying the present invention, a main housing body 1 contains therein a paper supplying section 3, a processing section 7 and a paper discharging section 9. The processing section 7 occupies the center part of the housing body 1 and includes a photosensitive drum 12. To the right of the processing section 7 is the paper supplying section 3 which includes a paper tray 7 and paper cassettes 5 and 6. The paper discharging section 9 is on the left-hand side of the processing section 7 and includes discharge rollers 8. A conveyor belt 13 and fixing rollers 11 are disposed between the processing section 7 and the paper discharging section 9. A control panel 10 is formed on the upper surface of the main housing body 1 and an automatic document feeder 21 is attached to the upper surface of a document table 15. The automatic document feeder 21 includes a document tray 22, a document transporting unit 25 and a document cover 26. A document discharging unit 23 is formed on the upper surface of the document cover 26.

External to the paper discharging section 9 of the main housing body 1 is a sorter 31 equipped with a plurality of bins 34a–34n. Inside the sorter 31 are a vertical conveyor belt 35 and a guiding member 33. The guiding member 33 is adapted to move in the direction of arrow A or arrow B and the conveyor belt 35 serves to lead each sheet of paper discharged from the paper discharging section 9 to the guiding member 33. Also inside the sorter 31 is a flapper 32 which can be operated to open and close the passage of the processed paper to the guide member 33. If the flapper 32 closes this passage, the discharged paper from the paper discharging section 9 is prevented from proceeding to reach the guiding member 33 and is led to a roller 37.

The main housing body 1 is set on top of a cabinet 41 which contains therein a tray 42 equipped with paper feeding rollers 44. A passage route 45 is also formed inside the cabinet 41 and is connected to a passageway 12 inside the main housing body 1. Another passageway 46 inside the cabinet 41 connects the tray 42 with another passageway 36 inside the sorter 31.

Figure 2:
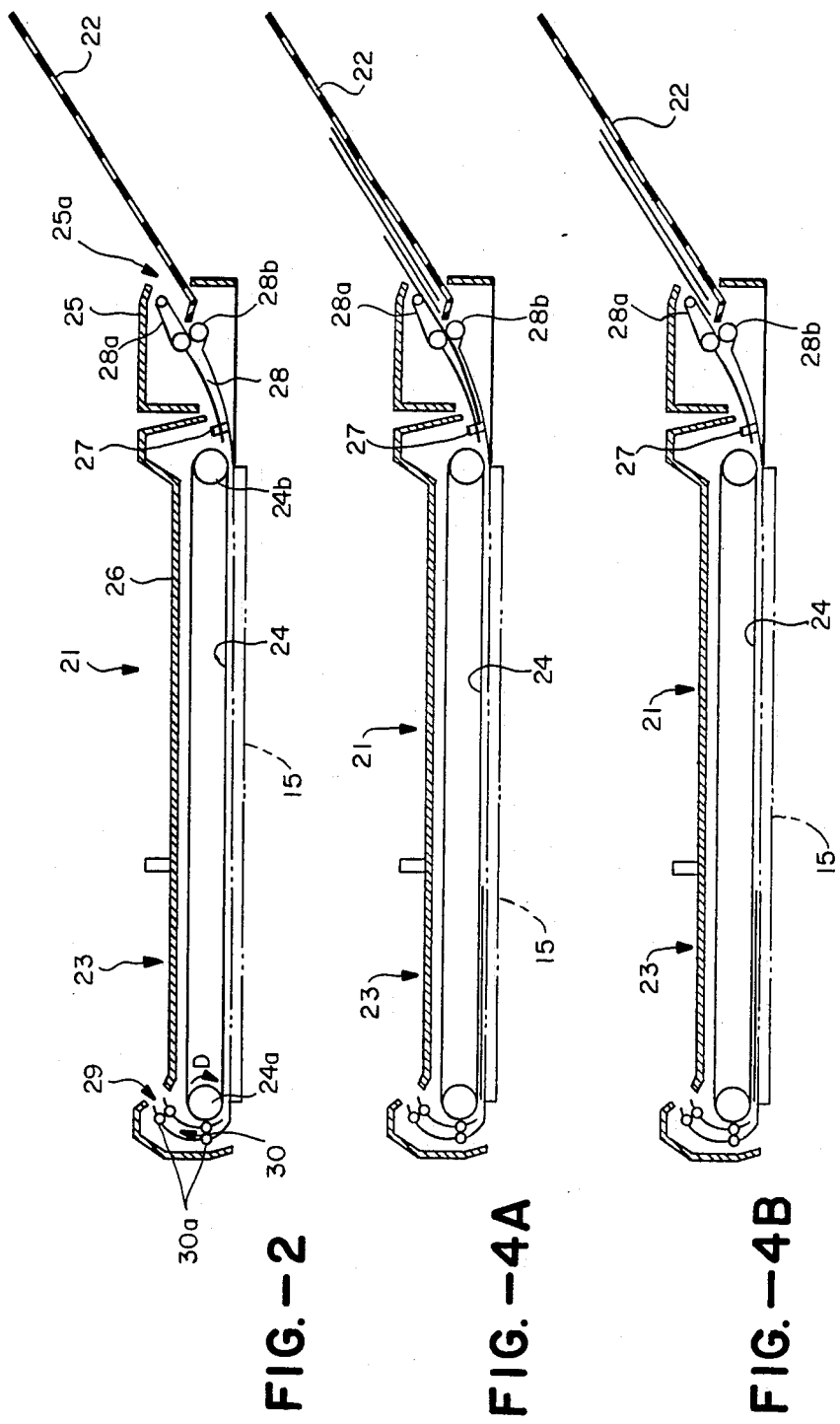
FIG. 2 is a front sectional view of an automatic document feeder embodying the present invention.

The structure of the automatic document feeder 21 is schematically illustrated in FIG. 2 in which components already explained by way of FIG. 1 are indicated by the same numerals. The document cover 26 is openably attached to the top surface of the document table 15 and contains therein a document conveyor belt 24 stretched between rollers 24a and 24b. The roller 24a is attached to the shaft of a motor (not shown) and rotates in the direction of the arrow D, driving the other roller 24b and the belt 24. Inside the document cover 26 near the roller 24a is a document discharging passageway 30 equipped with discharging rollers 30a. The document discharging section 23 is formed on the top surface of the document cover 26 equipped with a document discharging opening 29. The passageway 30 connects the document table 15 with the discharging opening 29.

The document transporting unit 25 has an opening 25a next to the document tray 22. A document transporting passageway 28 is formed inside the document transporting unit 25 and connects the opening 25a to the document table 15. Also inside the document transporting unit 25 and near the document tray 22 are a document transporting belt 28a and document transporting rollers 28b. A portion of the document transporting passageway 28 extends to the interior of the document cover 26 and a stopper 27 is movably attached in this neighborhood to open or close the passageway 28. It is this stopper 27 that defines the aforementioned waiting position.

Figure 3:
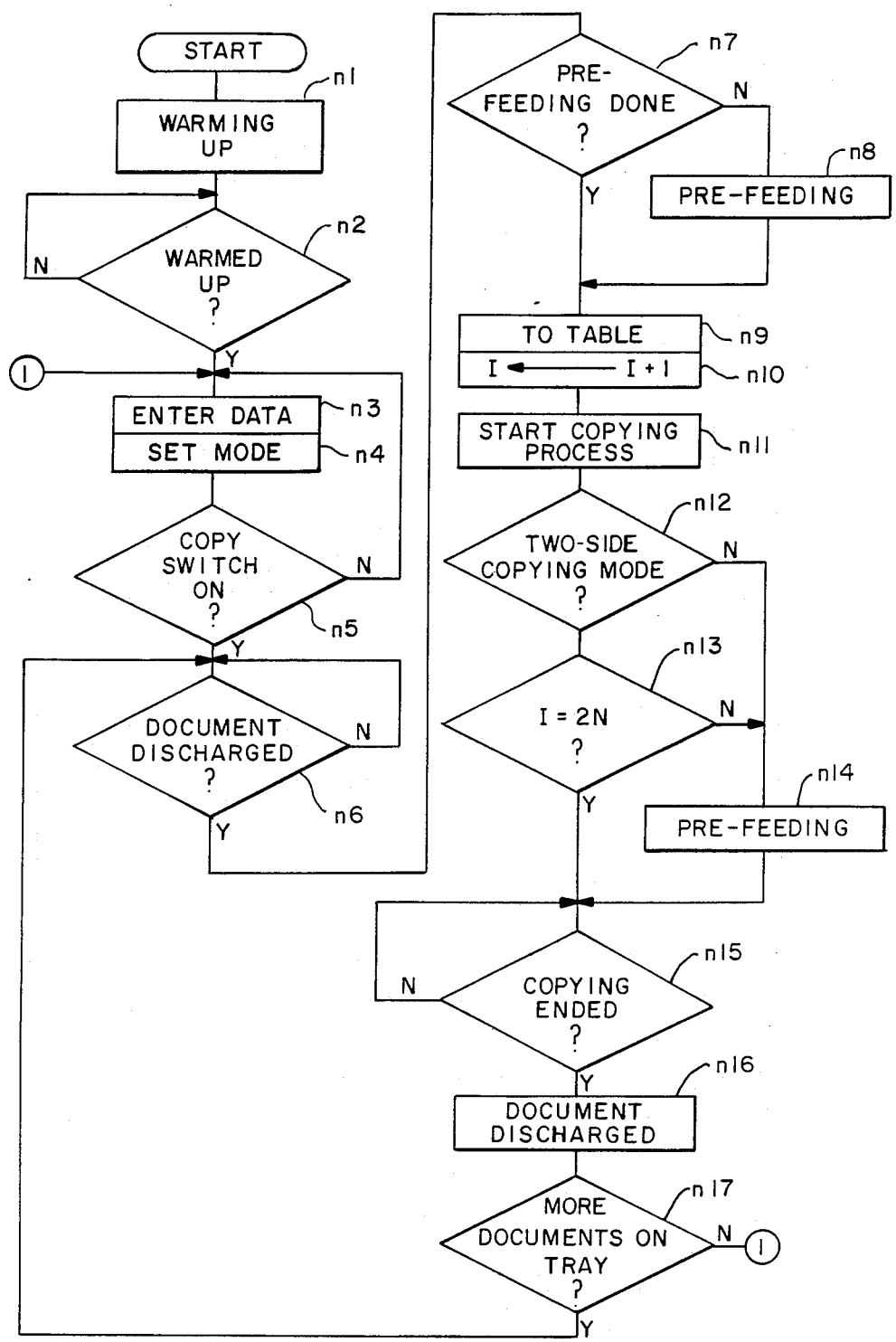
FIG. 3 is a flow chart for the operation of the automatic document feeder of FIG. 2 and the copying machine of FIG. 1 incorporating it.

The operation of this automatic document feeder 21 as well as the automatic two-side copying machine is described next by way of a flow chart. With reference to FIG. 3, the system is warmed up (n1) as soon as power is switched on. After the warming-up process is completed (n2), data related to the copying operation to be performed such as the paper size, image magnification and the number of copies to be produced are entered (n3) and a selection is made between the one-side and two-side copying modes (n4). When a copy switch is operated (YES in n5), it is checked whether there still remains on the document table 15 a document which has already been copied (n6). If it is determined that the copied document has been discharged (YES in n6), it is checked whether a next document to be copied has been preliminarily advanced to the waiting position (n7). If not, the document at the top of the pile stacked on the tray 22 is moved to the waiting position by the belt 28a and the rollers 28b (n8). At this moment, the passageway 28 is closed by the stopper 27. As soon as the front edge of the document reaches the position of the stopper 27, both the belt 28a and the rollers 28b are stopped temporarily and the stopper 27 opens up the passageway 28.

Thereafter, the document is transported onto the document table 15 by means of the belts 28a and 24 and the rollers 28b (n9). Simultaneously, the content I of a counter for counting the number of transported document sheets is increased by 1 (n10). Copying operation is started as soon as the front edge of the document to be copied reaches a preset position on the document table 15 (n11). While the copying operation is carried out for this document, the system determines whether it is operating in two-side copying mode or not (n12). If it is in two-side copying mode, it is checked next whether the counting I is even or odd (n13). If it is in one-side copying mode, or if it is in two-side copying mode and I is odd (NO in n12 or n13), the belt 28a and the rollers 28b are activated as described above and the next document to be copied is advanced to the waiting position (n14). If it is in two-side copying mode and I is even (YES in n12 and n13), or after the completion of Step n14, the system waits until the copying process then proceeding is completed (n15). In other words, Steps n12 through n14 are carried out while the copying process is taking place. These steps are carried out by what was referred to above as the selecting means.

After the completion of copying process, the belt 24 and the discharging rollers 30a cooperate to discharge the copied document on the document table 15 through the discharging passageway 30 and opening 29 to the discharging section 23 (n16). Thereafter, it is examined whether there are any documents remaining on the tray 22 (n17). If there are (YES in n17), the system returns to Step n6 and Steps n6 through n17 are repeated. If there is none (NO in n17), it is interpreted as the end of the copying work and the system returns to Step n3.

In summary, stacked documents on the tray 22 are sequentially delivered onto the document table 15 one sheet at a time by Steps n6 through n10 in one-side copying mode of operation and the copying process is started in Step n11. The process continues from Step n12 through Step n13 to Step n14 where the document to be copied next is pre-fed to the waiting position. After the copying is completed, the copied document is discharged but since the next document to be copied is already at the waiting position (YES in n7), the system advances directly from Step n7 to Step n9.

The document to be fed next remains on the tray 22 as shown in FIG. 4B. If jamming of the copying machine occurs in this case, therefore, the user will find it much easier to repeat the copying of the affected documents of which the first surfaces have already been copied.

The foregoing description of a preferred embodiment of the invention has been presented for purposes of illustration and description. It is not intended to be exhaustive or to limit the invention to the precise form disclosed, and many modifications and variations are possible in light of the above teaching. Such modifications and the variations that may be apparent to a person skilled in the art are intended to be included within the scope of this invention.

What is claimed is:

1. In an automatic document feeder associated with an automatic two-side copying machine which operates selectably in a one-side copying mode wherein only one surface of an original document is scanned or a two-side copying mode wherein both surfaces of an original are successively scanned, said document feeder comprising a document table where a document is placed for copying, a tray means where documents to be copied are originally placed, said document table and said tray means defining a waiting position therebetween, and pre-feeding means for moving a document to be copied next from said tray means until the front edge of said next document reaches said waiting position, the improvement wherein said automatic document feeder is so controlled as to automatically operate said pre-feeding means when said copying machine is operating in said one-side copying mode of operation or when said copying machine is scanning the first surface of a document in said two-side copying mode of operation and to automatically prevent said pre-feeding means from functioning when said copying machine is scanning the second surface of a document in said two-side copying mode of operation.

2. The automatic document feeder of claim 1 wherein said selecting means include a stopper adjustably disposed at said waiting position, said stopper serving either to allow or disallow passage of a document from said tray means to said document table.

3. The automatic document feeder of claim 1 wherein said selecting means include a counter means for identifying whether the first or second surface of a document is being copied by said copying machine in said two-side copying mode of operation.

* * * * *